RECEIVER FOR PLURAL FREQUENCY PHASE DIFFERENTIAL TRANSMISSION SYSTEM

Filed May 2, 1966

INVENTORS
WATSON F. WALKER
THIJS deHAAS
MARTIN B. GRAY
BY
ATTORNEY

INVENTORS
WATSON F. WALKER
THIJS deHAAS
BY MARTIN B. GRAY
Martin L. Kacher
ATTORNEY

BY

INVENTOR.
WATSON F. WALKER
THIJS deHAAS
MARTIN B. GRAY

Martin [signature]
ATTORNEY

United States Patent Office 3,456,194
Patented July 15, 1969

3,456,194

RECEIVER FOR PLURAL FREQUENCY PHASE DIFFERENTIAL TRANSMISSION SYSTEM

Watson F. Walker, Thijs de Haas, and Martin B. Gray, Monroe, N.Y., assignors to General Dynamics Corporation, a corporation of Delaware Filed May 2, 1966, Ser. No. 546,813
Int. Cl. H04b *1/16*
U.S. Cl. 325—320 10 Claims

ABSTRACT OF THE DISCLOSURE

A frequency differential phase shift keyed communication system is described having correlation detection means which correlate the received tones and locally generated tones over intervals less than the symbol interval and then combine the outputs of the correlation means in weighed combination in order to compensate for the loss of orthogonality, while at the same time reducing inter-symbol crosstalk.

The present invention relates to communications systems and particularly to systems for the communication of digital information.

The invention is especially suitable for use in phase shift keyed communications systems of the multiplex type wherein digital information is represented by the phase shifts imparted to a plurality of tones. The invention may also be applied with especial advantage in frequency differential phase shift keyed communication systems of the type described in U.S. Patent 3,036,157, which issued on May 22, 1963 to G. A. Franco and G. Lachs. The invention is also generally useful in communications systems which use correlation detection techniques to derive the transmitted information.

Often in the transmission of signals over a communication link, such as a long distance radio path, the effective length or interval of a signal element may be perturbed. In a phase shift keyed communications system each signal element carries a unique item of information or symbol such as a data bit or bits. The interval may thus be termed a symbol interval. Since each signal element is individually detected, the perturbation of the symbol interval effectively distorts the symbol and results in errors. More specifically, this symbol interval perturbation may be caused by amplitude and phase distortion interposed by filter circuits in the transmitter or receiver of a communication system and from multipath distortion introduced by the transmission media, such as a high frequency ionospheric propagation path. The distortion may manifest itself as adjacent symbol crosstalk, by which is meant an unwanted contribution from a signal transmitted in a preceding or succeeding symbol interval to the symbol interval which is being detected at the receiver. In a multflex communication system wherein information is transmitted by a plurality of tones of different frequency, the distortion may manifest itself as "interchannel crosstalk," by which is meant an unwanted contribution to the signal tone being detected from other signal tones.

In a correlation detection system the symbol is detected by correlating the input signal with a known signal during the symbol interval. An approach to crosstalk reduction is the insertion of a "guard time" between transmitted symbol intervals. Correlators in the receiver then remain inoperative during the guard time interval between adjacent symbol intervals. Circuit complexity and increased band width, however, are necessary in order to accommodate the use of guard time. Another drawback of guard time is a reduction in the data transmission capacity of the communications system inasmuch as the time required for the transmission of any block of data would be increased by the amount of guard time which is interposed.

Accordingly, it is an object of the present invention to provide an improved communications system in which crosstalk distortion is reduced without incurring a loss in the information transmission capacity of the system.

It is a further object of the invention to provide an improved multiplex communications system, having an improved detection system for receiving multiplex signals by means of which the effects of signal distortion are reduced.

It is a still further object of the present invention to provide an improved communications system which uses correlation detection to derive transmitted information in which signal distortion is reduced without increasing the time required for the transmission of information and without increasing the band width requirements thereof.

It is a still further object of the present invention to provide an improved communications system in which successive symbols are transmitted in successive symbol intervals, wherein crosstalk caused by overlapping of adjacent symbols is reduced.

It is a still further object of the present invention to provide an improved communications system in which a plurality of tones is transmitted, and each tone is divided into successive symbol intervals wherein crosstalk due to multipath and other amplitude, phase and delay distortion in transmission and reception is reduced.

It is a still further object of the present invention to provide an improved orthogonal function communication system, using correlation detection at a receiving point, wherein interchannel and adjacent symbol crosstalk are reduced.

Briefly described, a communication system embodying the invention is operative to transmit signals carrying information, which may, for example, represent successive data bits, from a transmitting point to a receiving point over a transmission link, such as a radio path. Successive elements of the signal are transmitted in successive, adjacent symbol intervals. At the receiving point correlators are provided which are operative during successive intervals which are shorter than the symbol interval. In other words, the transmitted symbol length remains unchanged while the detection interval is shortened. Such shortened detection time reduces crosstalk, since the signal is not being detected during the time that the signal is suffering maximum distortion. Correlation detection, however, depends upon the orthogonality between the transmitted signal and the locally generated signal with respect to which the transmitted signal is compared in the correlators. The shortened detection time results in a loss of orthogonality. Compensating networks are provided in the receiver which respond to the outputs of the correlators and combine these output in weighted combinations which are functions of the loss of orthogonality which results from shortened detection interval. Outputs are in turn derived from the compensating networks which are applied to decision networks which derive the data which is transmitted during each symbol interval.

The invention itself, both as to its organization and method of operation, as well as additional objects and advantages thereof will become more readily apparent from a reading of the following description in connection with the accompanying drawings in which.

Figure 1:
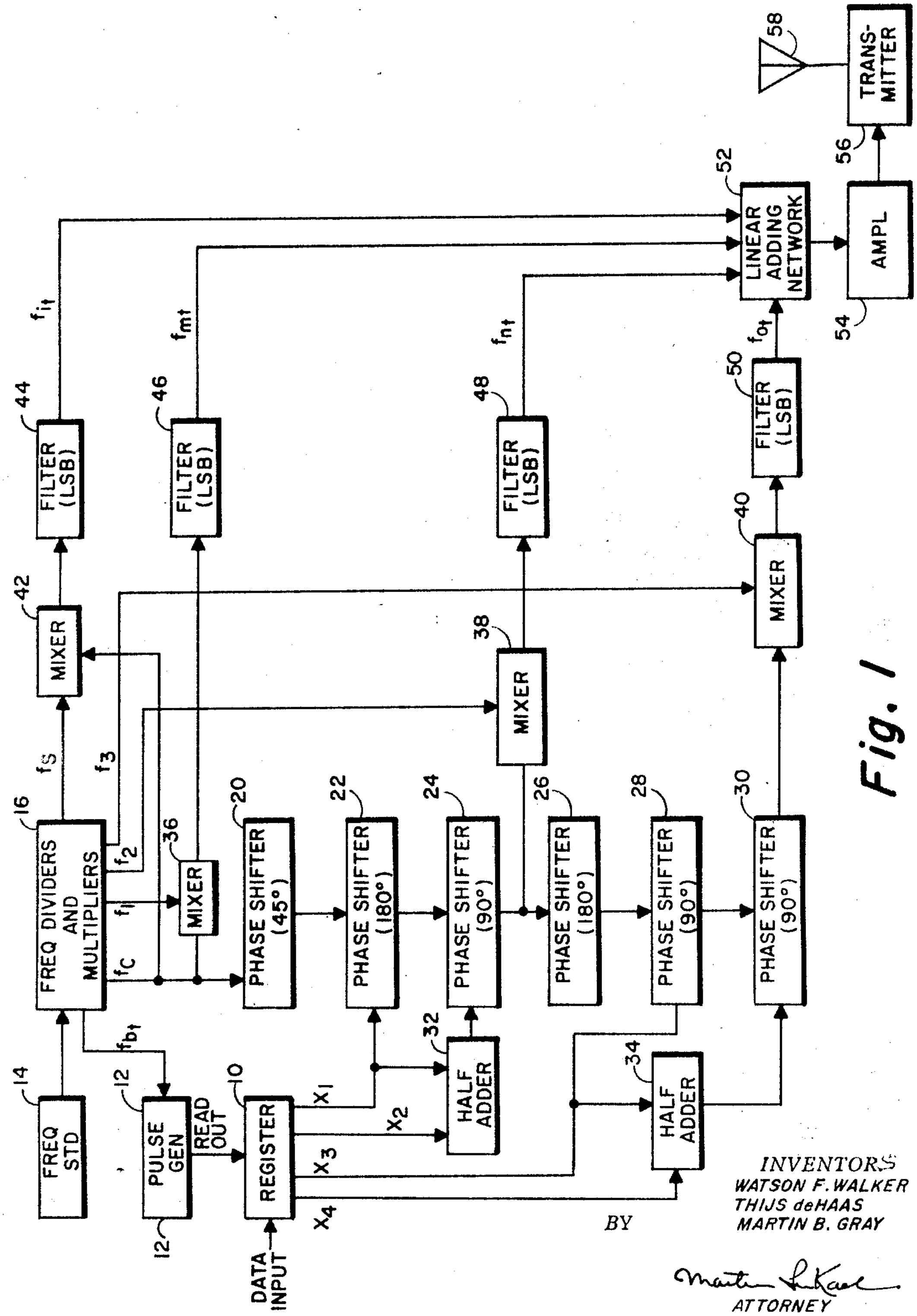
FIGURE 1 is a simplified block diagram of the transmitter portion of a system embodying the invention.

Referring more particularly to FIGURE 1, there is shown a register 10, in which a plurality of bits of digital data as may arrive serially from a data input line may be stored. Four bits which are available in parallel in the output stages of the register 10 are indicated as $X_1$, $X_2$, $X_3$ and $X_4$. The register 10 may be a shift register from which these last four bits are read out in response to a readout pulse. While only four bits are indicated, a much larger number of bits may be simultaneously transmitted by a system embodying the invention.

The readout pulses are generated by a pulse generator 12 which provides repetitive pulses at a given frequency, the period of which is equal to the symbol interval during which a plurality of bits is transmitted. A suitable given frequency may be 25 c./s. This frequency is indicated generally as $f_{bt}$ and is the time base of the system. $f_{bt}$ is derived from a frequency standard 14, which may be a crystal controlled oscillator. The output of this standard 14 is applied to frequency dividers and multipliers 16, which may include tandem connected flip-flop circuits as well as nonlinear multiplier circuits of the type known in the art. In addition to the signal of frequency $f_{bt}$, the circuits 16 provide signals of other frequencies $f_c$, $f_1$, $f_2$, $f_3$ and $f_s$. $f_c$ may be a frequency which is a few orders of magnitude higher than $f_{bt}$ and may be a multiple of the frequency $f_{bt}$, as may conveniently be provided by the circuit 16. $f_c$ may suitably be 1000 c./s. or the fortieth harmonic of $f_{bt}$. $f_s$ may be a frequency in a range suitable for application to the input of a radio transmitter, line modulator or other multiplex unit.

The relationship between the signals so far described may be represented by the following equations:

$$f_s = nf_{bt} \qquad (1)$$

where $n$ is an integer $$f_1 = f_s + f_{bt} \qquad (2)$$

$$f_2 = f_s + 2f_{bt} \qquad (3)$$

$$f_3 = f_s + 3f_{bt} \qquad (4)$$

The information is transmitted on the basis of quadrinary phase shift keying by means of a plurality of phase shifters 20, 22, 24, 26, 28 and 30, which are connected in tandem and through which the signal of frequency $f_c$ passes and is progressively phase shifted. The phase shift keyers 20 and 26 may be resistor-capacitor networks which provide a phase shift of 45° ($\pi/4$ radians). The phase shifters 22 and 28 may be amplifiers having one stage which preferably provides zero gain and which may be electronically switched into and out of the phase shifter chain, respectively when the bit applied thereto is a binary "1" bit and a binary "0" bit. These amplifiers are inverted amplifiers and provide a 180° ($\pi$ radians) phase shifted when interposed in the chain in response to the binary "1" bit input thereto. The phase shifters 24 and 30 may similarly be amplifier circuits having resistor capacitor networks which provide 90° ($\pi/2$ radians) phase shift when these stages are switched into the chain of phase shifter circuits. A phase shift of 90° is interposed by these circuits 24 and 30 in response to an input representing a binary "1" bit. The stages 24 and 30 are electrically short circuited in response to a binary "0" bit. Digital signal operated electronic switching for connecting and disconnecting stages from a circuit are well known in the art and are therefore not described in detail herein. Of course, other types of digitally operated phase shifter circuits may be used. For example, $f_c$ may be generated in all of its eight possible phases and gates provided to select the desired phases in accordance with the digital signals which are provided.

The $X_1$ and $X_2$ bits provide the digital signals which control the 180° phase shifters 22 and 28, respectively. The 90° phase shifters 24 and 30 are controlled by digital signal outputs from modulo two adding circuits, such as half adders 32 and 34. The half added 32 provides the modulo two sum of the $X_1$ and $X_2$ bits. The half added 34 provides the modulo two sum of the $X_3$ and $X_4$ bits.

The phase difference between tones adjacent to each other in frequency is used to represent two bits. This phase difference may be represented as $\Delta\theta_k$, $\Delta\theta_{k-1}$. . . . These angles are coded into any one of the four phase positions; namely 45°, 135°, 225° and 315°, corresponding to the respective values of adjacent bits of 00; 01; 11; and 10.

Figure 2:
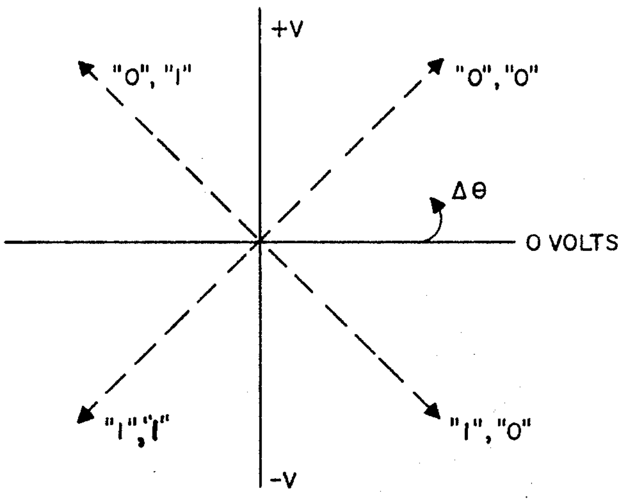
FIGURE 2 is a diagram of the phase coding of digital information in the system of FIGURE 1.

FIGURE 2 graphically represents the above-described phase coded relationship. This relationship may be expressed by the following equation which represents the absolute phase of the signal in the output of the phase shifter 30:

$$\theta_k = [\theta_{k-1} + \pi/4 + (X_4 \oplus X_3)\pi/2 + X_3\pi] \qquad (5)$$

The phase angle of the signal emmanating from the phase shifter 24 may be represented by the following equation:

$$\theta_{k-1} = [\pi/4 + (X_2 \oplus X_1)\pi 2 + X_1\pi] \qquad (6)$$

It will be appreciated that through the use of additional groups of phase shifters as would include 45°, 180° and 190° shifters similar to shifters 26, 28, 30, additional pairs of bits may be simultaneously coded and transmitted with the bits $X_1$ through $X_4$, during each symbol interval.

Mixers 36, 38, 40 and 42 are provided for heterodyning the signals of frequency $f_c$ and the outputs of the phase shifters 24 and 30 into tones which are separated by the time base frequency $f_{bt}$. The lower side band outputs of these mixers 36, 38, 40 and 42 are passed by means of filters 44, 46, 48 and 50 to a linear adding network 52 which combines these signals and applies them to a transmitter 56 after amplification in an amplifier 54. The combined signals are transmitted by a transmitter 56 which may be a high frequency radio transmitter which propagates the signals by way of an antenna 58 over a radio link to a receiving point. Although lower sideband signals are utilized, upper sideband rather than lower sideband products may be used. In the event that the sideband products are in a range removed from the other mixer product frequencies, a single filter immediately ahead of the amplifier 54 may be used to remove all but the desired sideband products. The tones which are transmitted are indicated as $f_{lt}$, $f_{mt}$, $f_{nt}$ and $f_{ot}$. These tones are separated by the time base frequency $f_{bt}$, as will be apparent from the following equations which define their frequencies.

$$f_{lt} = f_s - f_c \qquad (7)$$

$$f_{mt} = f_{lt} + f_{bt} \qquad (8)$$

$$f_{nt} = f_{lt} + 2f_{bt} \qquad (9)$$

$$f_{ot} = f_{lt} + 3f_{bt} \qquad (10)$$

The combined signal which is presented to the transmitter for transmission may be represented as:

$$s(t) = \sum_{v} A_v \sin(\omega_v t + \phi_v) \qquad (11)$$

Where $A_v$ is the amplitude of each signal tone, $\omega_v$ is the frequency of each tone and $\phi_v$ is the phase angle of each tone.

Figure 3:
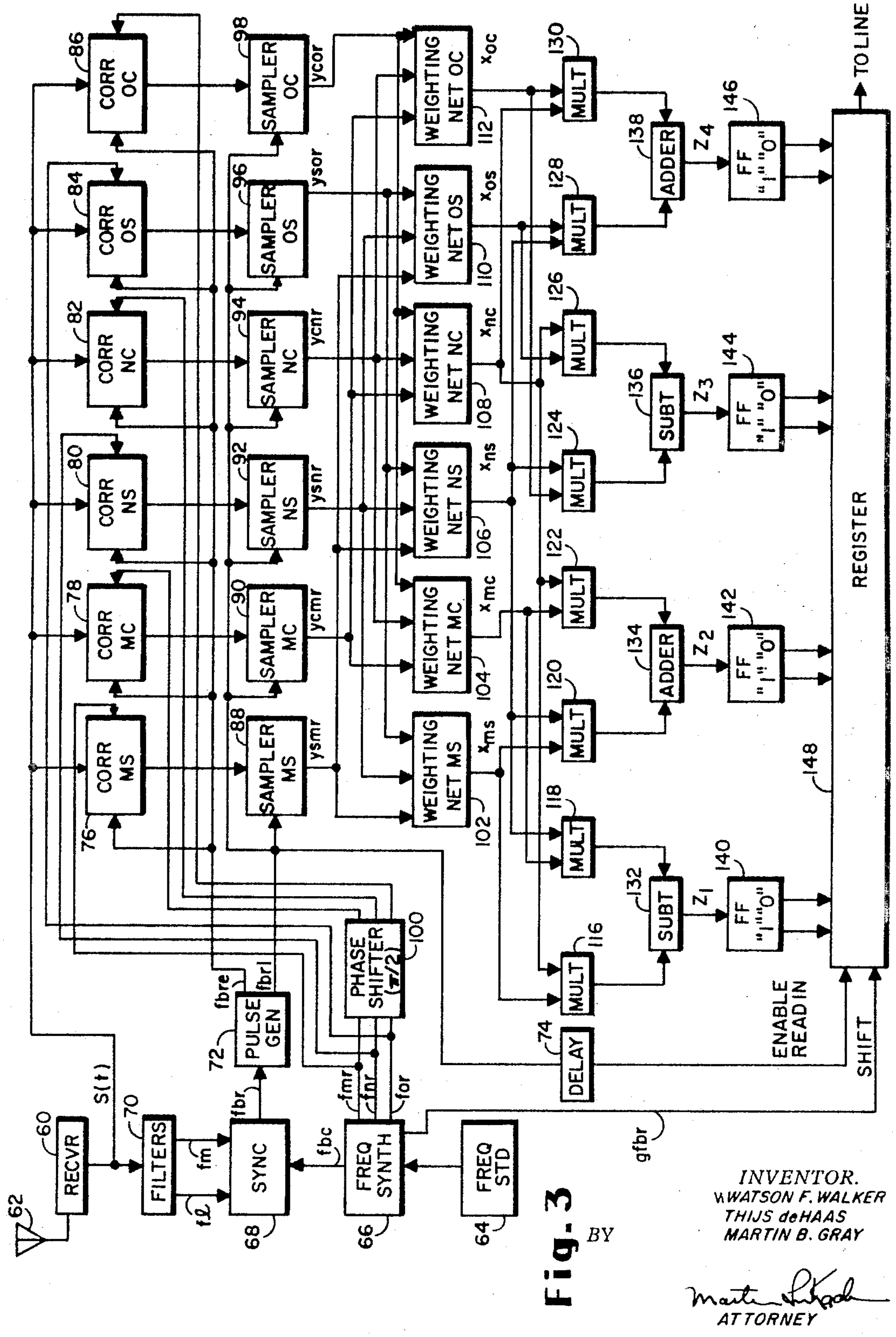
FIGURE 3 is a simplified block diagram of the receiver portion of a system embodying the invention.

In the receiving portion of the system which is illustrated in FIGURE 3, receiver 60 derives signals which are transmitted by the transmitter 56 (FIGURE 1). The receiver 60 may be a high frequency communications receiver which is connected to an antenna 62. The total incoming signal at the input of the receiver, $s(t)$ contains all of the tones which are transmitted over the radio link; viz $f_{lt}$, $f_{mt}$, $f_{nt}$ and $f_{ot}$. These tones may be represented individually by the following expressions:

$$s_{ot} = A_{ot} \sin(\omega_{ot} t + \theta_k) \qquad (12)$$

$$s_{nt} = A_{nt} \sin(\omega_{nt} t + \theta_{k-1}) \qquad (13)$$

$$s_{mt} = A_{mt} \sin(\omega_{mt} t + \theta_{k-2}) \qquad (14)$$

The incoming tone at frequency $s_{lt}$, and the incoming tone at frequency $f_{mt}$ are both unmodulated and are used for time base synchronization purposes, as will appear shortly.

A frequency standard 64, which may be similar to the frequency standard 14 (FIGURE 1) provides signals to a frequency synthesizer 66, which may be similar to the frequency divider and multiplier circuit 16 (FIGURE 1) and generates a plurality of signals having the same frequencies as those generated in the circuits 16. These signals are designated as $f_{mr}$, $f_{nr}$ and $f_{or}$. Another signal, having a frequency $f_{br}$ is generated by the synthesizer 66, and a signal having a frequency of $qf_{br}$ is also generated. $f_{br}$ is equal to $f_{bt}$, which is generated in the transmitter portion of the system. $q$ is the ratio of the rate at which data is transmitted in bits per second to the number of symbol intervals per second. In the illustrated system, $q$ is equal to four, and $qf_{br}$ is 100 c./s.

It is desirable that the symbol interval during reception be the same as the symbol interval during transmission. To this end, a synchronizing system 68 is provided. The receiver-generated frequency $f_{br}$ and the received transmitted tones $f_{mt}$ and $f_{lt}$, which are extracted from the total incoming signal $s(t)$ by means of filter circuits 70, are applied to the synchronizing system 68. This system 68 may include mixer circuits which heterodyne the tones $f_{mt}$ and $f_{lt}$ with each other to provide an output having the difference frequency there between ($f_{bt}$). A phase locked loop, as may include a variable frequency oscillator and a phase detector for controlling the frequency thereof, may also be provided in the synthesizing system 68. This oscillator may have a nominal frequency of $f_{br}$ or 25 c./s. The output of the oscillator is compared in the phase detector with the output of the mixer to provide an error signal in accordance with the phase difference between $f_{br}$ and $f_{bt}$. The phase locked loop oscillator is therefore phase locked by this error signal so that $f_{br}$ is phase locked with $f_{bt}$. Accordingly the receiver symbol interval and the transmitter symbol interval will be synchronized with each other.

A pulse generator 72 shapes the synchronizing system output signal $f_{br}$ into a pair of short pulses which occur before and after the beginning of each symbol interval. These pulses are designated as $f_{bre}$, occurring just after the beginning of the symbol interval and $f_{brl}$, occurring just before the end of the symbol interval. The time interval between these pulses is equal to the shortened detection time and may be represented as T′, which is shorter than the symbol interval T ($T=1/f_{br}$) by the increment $\delta$. Thus the time interval between the pulses of frequencies $f_{bre}$ and $f_{brl}$ is equal to $\delta$ and the interval between the beginning and end of each symbol interval and the pulses and frequencies $f_{bre}$ and $f_{brl}$ are each $\delta/2$. These relationships are graphically displayed in FIGURE 4, which will be discussed more fully hereinafter.

The circuits which are contained in the pulse generator 72 for generating the pulses of frequencies $f_{bre}$ and $f_{brl}$ may be circuits which translate the input signal of $f_{br}$ into a square wave, detect the positive-going zero cross-overs and generate a pulse upon occurrence thereof. This pulse may be amplified, clipped, and thereby effectively stretched. The leading and lagging edges of this pulse may be differentiated and amplified to derive the pulses of frequencies $f_{bre}$ and $f_{brl}$, respectively. Since these circuits which perform such pulse generating functions are well known in the art, they are not described in detail herein.

The $f_{brl}$ pulses are applied to a delay circuit 74 which delays the pulse by an interval equal to $\delta/2$ and provides a short pulse which occurs at the beginning of each symbol interval. This pulse is applied to an output register in order to time the entry of data therein from the decision circuits of the receiver which will be described more fully hereinafter.

As was noted in the discussion of the transmitter portion of the system, the information is transmitted in terms of the phase difference between the transmitted tones which are adjacent to each other in frequency. The transmitted tones may be shifted during propagation over the radio link, due, for example, for multipath and fading. The filters in the receiver 60, as well as transmitter 56, through which these tones pass, may also cause them to be phase shifted, thus resulting in a phase shift of the individual tones, as well as in crosstalk distortion, which was discussed above. For example, the tone $s_{ot}$ may, on reception, be represented by the following equation:

$$s_{ot(r)}=A_{ot}\sin(\omega_{ot}t+\phi_k) \quad (15)$$

The new phase angles $\phi_k$ and $\phi_{k-1}$ include propagation and other phase shifts and may be represented as:

$$\phi_k=\theta_k-A_k;\ \phi_{k-1}=\theta_{k-1}-A_{k-1} \quad (16)$$

Where $A_k$ and $A_{k-1}$ represent these phase shifts, the differential phase shift between the received information tones which are adjacent to each other in frequency, such phase difference being defined with respect to the system time base, represents the transmitted information. The phase difference between the tones $s_{ot}$ and $s_{nt}$ may be derived from the absolute phase angles of these tones in accordance with the relationship:

$$\Delta\phi_k=(\phi_k-\phi_{k-1}) \quad (17)$$

Where $\Delta\phi_k$ is the phase difference between the tones $s_{ot}$ and $s_{nt}$ and $\phi_k$ and $\phi_{k-1}$ are the absolute phase angles of these tones during a symbol interval. The phase shift of the signal $s_{ot}$ is essentially equal to the phase shift of the signal $s_{nt}$ because of their close frequency spacing. Accordingly, the propagation phase shift $A_{k-1}$ associated with the signal $s_{nt}$ is essentially equal to the phase shift $A_k$ (see Equation 16). The phase difference angle $\Delta\phi_k$ is therefore equal to the difference between the absolute phase angles of the tones $s_{ot}$ and $s_{nt}$ as received, which is also equal to the phase difference between the tones as transmitted. In other words:

$$\Delta\phi_k=\Delta\theta_k \quad (18)$$

Accordingly, the information may be derived from the difference angle $\Delta\phi_k$ alone.

Figure 4:
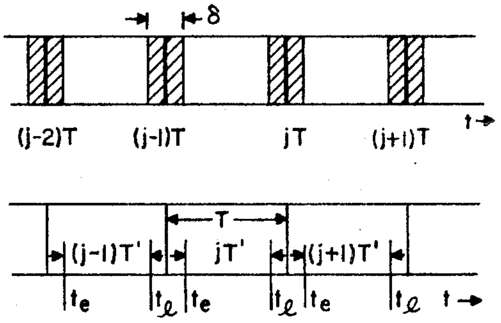
FIGURE 4 is a diagrammatic presentation of the successive symbol intervals of signals which are transmitted and received by the system illustrated in FIGURES 1 and 3.

The uppermost diagram in FIGURE 4 illustrates the effect of multipath and other phase distortion such as results from high frequency ionospheric propagation of the signal. Each symbol $(j-2)T$ through $(j+1)T$ represents the phase state of one of the tones transmitted during a symbol interval T. The shaded area represents the overlap of the times of arrival at the receiver of the same portions of the signal traveling over different paths. This causes the symbol transition to be smeared over an interval equal to the multipath delay spread, $\delta$. Correlation detection over the $(j)$th symbol interval therefore includes a component determined by the phase of the $(j-1)$ and the $(j+1)$ symbol intervals. In other words, both the $(j-1)$ and the $(j+1)$ symbols distort the output of the correlator during the $(j)$th interval for $\delta/2$ intervals at the beginning and at the end of the $(j)$th symbol interval.

The system of the invention is operative during a shortened correlation interval or detection time T′ as shown in the lowermost diagram of FIGURE 4. This interval is centered with respect to the symbol interval and displaced from the ends thereof by the delay spread (viz. $\delta/2$ at each end). The correlation detection interval is determined by the $f_{bre}$ and $f_{brl}$ pulses which are respectively applied to correlators 76, 78 (for the $s_{mt}$ tone); 80 and 82 (for the $s_{nt}$ tone); and 84 and 86 (for the $s_{ot}$ tone) and to samplers 88, 90, 92, 94, 96 and 98, which respectively determine the outputs of the correlators 76, 78, 80, 82, 84 and 86 upon occurrence of the $f_{brl}$ pulse. The correlators may be circuits of the type known in the art which multiply and integrate the signals applied thereto. The multiplier may be a diode multiplier, and the integrator may be an RC integrating circuit which follows the multiplier. This integrator is reset as by discharging the capacitor thereof at the beginning of the shortened correlation interval by means of the $f_{bre}$ pulse. To this end, diodes may be connected across the capacitor and biased in the forward direction by the $f_{bre}$ pulse when it occurs. A pair of diodes polarized in opposite directions may be used to insure that the capacitors in the correlators are discharged, notwithstanding the polarity at which they are charged during the detection interval.

The correlators 76, 78, 80, 82 and 84 may be termed sine correlators and are designated by the characters MS, NS and OS, respectively, to designate by their initial character the tone and by the last character the type correlator. Similarly the correlators 78, 82 and 86 are designated by the letters MC, NC and OC respectively, similarly indicating the tone and the type of correlator (viz as cosine correlators). The locally generated signals $f_{mr}$, $f_{nr}$ and $f_{or}$ are applied to the sine correlators for their respective tones 76, 80 and 84, while these locally generated tones, after passing through a phase shifter 100, which shifts them in phase by 90°, are applied to the cosine correlators 78, 82, and 86 for their respective tones.

The operation of the correlators during the shortened detection intervals may be explained most simply by taking two of the tones at frequencies $f_{ot}$ and $f_{nt}$ and ignoring both the amplitude $A_{ot}$ and $A_{nt}$ thereof and also by ignoring the contribution of the $S_{mt}$ tone to their correlator outputs. As will be presently observed, this discussion will illustrate the effect of the shortened correlation or detection interval on the output of the sine correlator system, including the correlator 84 and the sampler 96. It will be, of course, appreciated as the discussion proceeds that simplifications and assumptions are made solely for purposes of clarity of explanation and without any limitation on the generality of the inventive concept set forth herein.

The shortened correlation interval extends from:

$$t=\delta/2 \text{ to } t=T-\delta/2 \qquad (19)$$

The two tones involved in the correlation process may be represented as:

$$s(t)=\sin(\omega_{ot}t+\phi_k)+\sin(\omega_{nt}t+\phi_{k-1}) \qquad (20)$$

The output of the sampler 96 may therefore be represented as:

$$ys_{or}=\int_{\delta/2}^{T-\delta/2}[\sin(\omega_{ot}t+\phi_k)+\sin(\omega_{nt}t+\phi_{k-1})]\sin\omega_{ot}t\,dt \qquad (21)$$

since $$\omega_{ot}=\omega_{or}=\omega_o \text{ and } \omega_{nt}=\omega_{nr}=\omega_n \qquad (22)$$

$$ys_{or}=\tfrac{1}{2}\int_{\delta/2}^{T-\delta/2}[\cos\phi_k-\cos(2\omega_o+\phi_{k-1})]dt + \tfrac{1}{2}\int_{\delta/2}^{T-\delta/2}[\cos\{(\omega_n-\omega_o)t+\phi_{k-1}\} - \cos\{(\omega_n-\omega_o)t+\phi_k\}]kt \qquad (23)$$

integrating, $$ys_{or}=\frac{T-\delta}{2}\cos\phi_k-\frac{\sin\omega_o\delta}{2\omega_o}\cos\phi_k - \frac{\frac{\sin(o-n)(\omega_{bt})\delta}{2}}{(o-n)(\omega_{bt})}\cos\phi_{k-1}-\frac{\frac{\sin(\omega_n+\omega_o)\delta}{2}}{(_n+\omega_o)}\cos\phi_{k-1} \qquad (24)$$

Where $(o-n)$ signifies the absolute number (viz 1, 2, 3) of tones between the tone being correlated and the tone which is producing the crosstalk therewith by virtue of the shortened correlation interval. In this simplified case the tones are adjacent to each other or one tone apart, therefore $(o-n)$ is equal to one.

If, $$2\omega_o \gg (o-n)(\omega_{bt}) \text{ and } (\omega_o+\omega_n)\gg(o-n)(\omega_{bt}) \qquad (25)$$

Then, $$ys_{or}=\frac{T-\delta}{2}\cos\phi_k-\frac{\delta}{2}\left(\frac{\frac{\sin(o-n)\omega_{bt}\delta}{2}}{\frac{(o-n)\omega_{bt}\delta}{2}}\right)\cos\phi_{k-1} \qquad (26)$$

simplifying and substituting $2\pi/T$ for $\omega_{bt}$ $$ys_{or}=\frac{T-\delta}{2}\cos\phi_k-\frac{\delta}{2}\,\frac{\sin\frac{\pi\delta}{T}}{\frac{\pi\delta}{T}}\cos\phi_{k-1} \qquad (27)$$

Similarly the output of the sine correlator for the $f_{nt}$ tone may be written, $$ys_{nr}=\frac{T-\delta}{2}\cos\delta_{k-1}-\frac{\delta}{2}\,\frac{\sin\frac{\pi\delta}{T}}{\frac{\pi\delta}{T}}\cos\phi_k \qquad (28)$$

It will be observed that the correlator outputs $ys_{or}$ and $ys_{nr}$ are represented by linear equations in terms of cosine $\phi_k$ and cosine $\phi_{k-1}$. This set of linear equations may be solved for cosine $\phi_1$, and cosine $\phi_{k-1}$ in order to determine the value of these angles. This solution may be obtained by matrix algebra which, in the case of two variables, may be reduced by the application of the following equations:

$$\frac{T-\delta}{2}=a;\ \frac{\delta}{2}\,\frac{\sin\frac{\pi\delta}{T}}{\frac{\pi\delta}{T}}=b \qquad (29)$$

the solution for $\phi_k$ is $$\cos\phi_k=\frac{a}{a^2-b^2}ys_{or}-\frac{b}{a^2-b^2}ys_{nr}=X_{os} \qquad (30)$$

and the solution for cosine $\phi_{k-1}$ is $$\cos\phi_{k-1}=\frac{a}{a^2-b^2}ys_{nr}-\frac{b}{a^2-b^2}ys_{or}=X_{ns} \qquad (31)$$

It will be observed from these equations that the output of the sampler 96 will provide the cosine $\phi_k$ term by reducing that output by the output of the correlator 92 as modified by a weighting factor $b/a^2-b^1$. Similarly, the cosine $\phi_{k-1}$ term is provided by the output of the sampler 92 modified by a similarly weighted output of the sampler 96. The appropriate weights may be contained in weighting networks 102, 104, 106, 108, 110 and 112, which combine the outputs of the correlator as derived from their respective samplers. It will be observed that the cosine correlator outputs of each tone contribute to each cosine term (see Equations 30 and 31). Similarly the sine correlator outputs contribute to each sine term (viz sine $\phi_{k-1}$ and sine $\phi_{k-2}$).

Figure 5:
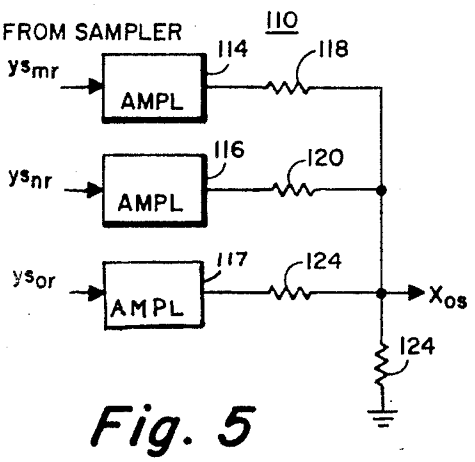
FIGURE 5 is a diagram of one of the weighting networks as shown in the receiver portion of the system which is illustrated in FIGURE 3.

By way of illustration, the weighting network 110 is illustrated in FIGURE 5. The output of the sampler 88 ($ys_{mr}$) and the sampler 92 ($ys_{nr}$) are applied to amplifiers 114 and 116, respectively. Weighting resistors 118 and 120 connect the outputs of these amplifiers 114 and 116 across resistor 122, together with the output of the sampler 96 ($ys_{or}$) which is applied to the adding resistor 122 by way of the amplifier 117 and the weighting resistor 124. The values of the weighting resistors 118, 120 and 124 are determined by a solution of the Equations 30 and 31, which are set forth above. Thus the output $X_{os}$ from the network 110 corresponds to the cosine of the phase angle of the $f_c$ tone (i.e. cosine $\phi_k$).

In general considering any two tones $f_k$ and $f_j$, having amplitudes approximately equal to A in the case where the effective multipath spread $\delta$ is smaller with respect to the correlation interval ($t/\pi$ is $\ll k_j$) which is the numerical difference between the position of the tones, viz where $k$ is the first tone and $j$ is the third tone $[(j-k)$ would be equal to 2$]$. The output of the sampler which is connected to the cosine correlator may be written as:

$$y_{cj}=\frac{AT}{2}\cos\phi_j-\frac{A\delta}{2}\sum_k\cos\phi_k\left(\frac{\sin\frac{\pi(j-k)\delta}{T}}{\frac{\pi(j-k)\delta}{T}}\right) \quad (32)$$

and the output of the sampler which is connected to the sine correlator may be written as, $$y_{sj}=\frac{AT}{2}\sin\phi_j-\frac{A\delta}{2}\sum_k\sin\phi_k\left(\frac{\sin\frac{\pi(j-k)\delta}{T}}{\frac{\pi(j-k)\delta}{T}}\right) \quad (33)$$

both for the $(j)$th tone.

The last term in Equations 32 and 33 illustrates that the contributions of tones far removed from the $(j)$th tone to the correlator outputs rapidly attenuate. Accordingly, in most practical cases only the outputs of a few tones in the immediate neighborhood of the $(j)$th tone need suitably be considered. Thus the weighting networks may include inputs from only such neighboring tones. Through the use of equations such as 32 and 33, and matrix algebra, the values of the weighting resistors may readily be determined.

The outputs of the weighting networks therefore represent the phase angles of the transmitted tones and may be expressed as follows:

$$\begin{aligned} X_{os}&=A_o\cos\phi_k\\ X_{oc}&=A_o\sin\phi_k\\ X_{ns}&=A_n\cos\phi_{k-1}\\ X_{nc}&=A_n\sin\phi_{k-1}\\ X_{ms}&=A_m\cos\phi_{k-2}\\ X_{mc}&=A_m\sin\phi_{k-2} \end{aligned} \quad (34)$$

These outputs may be compared with each other by means of the multiplier and added networks 116, 118, 120, 122, 124, 126, 128, 130, 132, 134, 136 and 138, which solve trigonometrically the equations set forth below to derive the outputs $Z_1$ through $Z_4$:

$$Z_4=X_{nc}X_{oc}+X_{ms}X_{os}=\frac{A_oA_nT^2}{4}\cos\Delta\theta_k \quad (35)$$

$$Z_3=X_{oc}X_{ns}-X_{os}X_{nc}=\frac{A_oA_nT^2}{4}\sin\Delta\theta_k \quad (36)$$

$$Z_2=X_{mc}X_{nc}+X_{ms}X_{ns}=\frac{A_nA_mT^2}{4}\cos\Delta\theta_{k-1} \quad (37)$$

$$Z_1=X_{nc}X_{ms}-X_{ns}X_{mc}=\frac{A_nA_mT^2}{4}\sin\Delta\theta_{k-1} \quad (38)$$

These outputs $Z_1$ through $Z_4$ are converted into digital form to provide the transmitted bits $X_1$ through $X_4$ by means of triggerable flip-flops 140, 142, 144 and 146.

By referring to FIGURE 2, it will be observed that the sines and cosines of the angles $\Delta\theta_k$ and $\Delta\theta_{k-1}$, as represented by the outputs $Z_1$ through $Z_4$, by their polarity dictate the values of the bits. For example, since $Z_4$ corresponds to the cosine of the angle $\Delta\theta_k$, $X_4$ must be a binary "0" bit if $Z_4$ is positive and a binary "1" bit if $Z_4$ is negative; $Z_4$ being the later of the pair of bits in accordance with the phase coding of these bits of transmission. Similarly $Z_3$, which is a function of the sine of the phase difference angle, dictates that the bit $X_3$ is a binary "0" if $Z_3$ is positive and a binary "1" if $Z_3$ is negative.

A register 140 is provided for storing the bits transmitted during each symbol interval and for reading these bits out in serial to a data line. The register 140 may be a shift register to which shift pulses are provided at the rate $qf_{br}$ through an adjustable delay circuit 142. The register is enabled to read the output of the flip-flop 132 to 138 by an enabling signal which is applied from the delay circuit 72. Since the pulse from the delay circuit 72 occurs after sampling, the flip-flops 132 to 138 will have stored the bits transmitted during the immediately preceding symbol interval. Accordingly, the information may then be read into the register.

The data is shifted along and out of the register by the shift pulses of frequency $qf_{br}$. Accordingly, there will be storage in the register for the bits transmitted between successive symbol intervals. The adjustable delay circuit may be used to insure that shift pulses do not coincide with read-in pulses from the delay circuit 72.

From the foregoing description it will be apparent that there has been provided an improved system for the transmission of information from a transmitting point to a receiving point. The communication system is adapted to transmit four bits during each symbol interval; however, it will be apparent that systems embodying the invention may be adapted for transmitting many more bits during each symbol interval.

The symbol interval duration and the frequencies which are mentioned should also only be taken as illustrative. The symbol intervals may be varied, the frequencies may be varied, and additional tones may be used in accordance with the invention. Other variations and modifications within the spirit and scope of the invention will undoubtedly become apparent to those skilled in the art. Accordingly, the foregoing description should be taken as illustrative and not in any limiting sense.

What is claimed is:

1. A communication system in which information is transmitted in accordance with the phase modulation of a plurality of tones from a transmitting point to a receiving point, said system comprising (a) detection means at said receiving point for deriving outputs representing the phase modulation of each of said tones with respect to a time base frequency, (b) said detection means including a plurality of correlation means operative over an interval less than the period of said time base frequency, (c) said detection means also including a plurality of weighting and combining networks coupled to said correlation means for combining weighted combinations of the outputs of said correlation means whereby to produce said detection means outputs, and (d) means responsive to said detection means outputs for deriving said transmitted information.

2. The invention as set forth in claim 1 wherin said correlation means are each operative to produce an output $y_{cj}$ defined by the following equation:

$$y_{cj}=\frac{AT}{2}\cos\phi_j-\frac{A\delta}{2}\sum_k\cos\phi_k\left(\frac{\sin\frac{\pi(j-k)\delta}{T}}{\frac{\pi(j-k)\delta}{T}}\right)$$

wherein:

T is the period of said time base frequency;

$j$ is an integer designating which of said plurality of tones is producing said $y_{cj}$ output;

A is the amplitude of said correlation means output;

$\delta$ is the difference between said interval over which said correlation means is operative and T;

$\phi_j$ is the phase modulation of the tone designated by said integer $j$;

$k$ are integers designating each of said plurality of tones other than the $(j)$th tone; and $\phi_k$ is the individual phase modulation of each of said plurality of tones other than said $(j)$th tone.

3. The invention as set forth in claim 1 wherein said correlation means are each operative to produce an output $y_{sj}$, defined by the following equation:

$$y_{sj}=\frac{AT}{2}\sin\phi_j-\frac{A\delta}{2}\sum_k \sin\phi_k\left(\frac{\sin\frac{\pi(j-k)\delta}{T}}{\frac{\pi(j-k)\delta}{T}}\right)$$

wherein:

T is the period of said time base frequency;

$j$ is an integer designation which of said plurality of tones is producing said $y_{sj}$ output;

A is the amplitude of said correlation means output;

$\delta$ is the difference between said interval over which said correlation means is operative and T;

$\phi_j$ is the phase modulation of the tone designated by said integer $j$;

$k$ are integers designating each of said plurality of tones other than the ($j$)th tone; and $\phi_k$ is the individual phase modulation of each of said plurality of tones other than said ($j$)th tone.

4. The invention as set forth in claim 1 wherein (a) means are provided at said transmitting point for progressively phase modulating said tones by discrete phase shifts in successive periods of said time base frequency in accordance with different bits of digital information, and (b) means are provided for transmitting a signal including components corresponding to each of said plurality of tones.

5. The invention as set forth in claim 1 wherein each of said plurality of weighting and combining networks includes a first weighting impedance element connected to the correlation means for one of said plurality of tones and a plurality of second impedance elements connected to the correlation means for said others of plurality of tones, the impedance of each of said second elements having the relation to the impedance of said first element which reduces the contribution of said correlation means connected thereto by a factor approximately equal to $$\frac{\delta\left(\sin\frac{\pi(j\text{-}k)}{T}\right)}{\frac{\pi(j\text{-}k)}{T}}$$

where:

T is the period of said time base frequency;

$j$ is an integer designating which of said plurality of tones is producing said $y_{cj}$ output;

$k$ are integers designating each of said plurality of tones other than the ($j$)th tone; and $\delta$ is the difference between said interval over which said correlation means is operative and T.

6. The invention as set forth in claim 1 wherein said detection means includes (a) means at said receiving point for generating a plurality of local signals having the same frequencies as said tones, (b) a pair of correlation circuits corresponding to each of said tones, (c) means for applying said transmitted tones and a different one of said local signals separately to said pairs of correlation circuits, said applying means including means for shifting the phase of the one of said local signals which is applied to one correlation circuit of each of said pairs by $\pi/2$ radians, so that different circuits of each of said pairs provide outputs which are functions of the sine and cosine of the phase modulation of the one of said tones corresponding thereto, (d) a plurality of pairs of combining networks, each pair corresponding to a different one of said tones, and (e) means for connecting said sine outputs to one of each of said pairs of networks and said cosine outputs to the others of each of said pairs of networks.

7. The invention as set forth in claim 6 wherein said connecting means each include a separate resistance element.

8. The invention as set forth in claim 7 wherein each of said separate resistance elements is a differently valued resistance which is a function of the output of the correlation circuit connected thereto.

9. The invention as set forth in claim 8 wherein each of said resistance elements is connected to an output resistance across which said detection means output is produced.

10. The invention as set forth in claim 9 wherein said means for deriving said transmitted information includes networks for effectively deriving the sum of the products of said detection means outputs taken from said networks corresponding to different pairs of said tones which are adjacent to each other in frequency.

References Cited

UNITED STATES PATENTS

| | | | |
|---|---|---|---|
| 3,128,430 | 4/1964 | Richmond | 325—305 X |
| 3,290,440 | 12/1966 | Easton | 178—67 |
| 3,294,907 | 12/1966 | Heald | 325—30 X |

ROBERT L. GRIFFIN, Primary Examiner
W. S. FROMMER, Assistant Examiner

U.S. Cl. X.R.

178—67; 325—30, 47, 60; 328—133